(12) United States Patent
Albizuri et al.

(10) Patent No.: US 9,200,807 B2
(45) Date of Patent: Dec. 1, 2015

(54) REGULATION VALVE FOR A GAS COOKING APPLIANCE

(71) Applicant: COPRECITEC, S.L., Aretxabaleta (ES)

(72) Inventors: Iñigo Albizuri, Muxika (ES); José Luis Oliva Aguayo, Jalisco (MX); Ruben Mateos Martin, Marietta, GA (US)

(73) Assignee: COPRECITEC, S.L., Aretxabaleta (ES)

( * ) Notice: Subject to any disclaimer, the term of this patent is extended or adjusted under 35 U.S.C. 154(b) by 273 days.

(21) Appl. No.: 13/804,236

(22) Filed: Mar. 14, 2013

(65) Prior Publication Data

US 2013/0260327 A1  Oct. 3, 2013

(30) Foreign Application Priority Data

Mar. 27, 2012  (ES) .............. 201230338 U (51) Int. Cl.
| | |
|---|---|
| *F15C 3/00* | (2006.01) |
| *F23N 1/00* | (2006.01) |
| *F16K 5/04* | (2006.01) |
| *F16K 5/10* | (2006.01) |
| *F16K 11/07* | (2006.01) |

(52) U.S. Cl.
CPC .............. *F23N 1/007* (2013.01); *F16K 5/0407* (2013.01); *F16K 5/10* (2013.01); *F16K 11/0704* (2013.01); *F23K 2900/05002* (2013.01); *F23N 2035/24* (2013.01); *Y10T 137/87861* (2015.04); *Y10T 137/87909* (2015.04)

(58) Field of Classification Search
CPC ....... F23N 1/00; F23N 1/007; F23N 2035/24; F16K 5/0407; F16K 5/0207; F16K 5/10; F16K 5/103; F16K 11/0704; F23K 2900/05002; Y10T 137/87909; Y10T 137/87861
USPC ............ 137/881, 862, 887; 251/207; 431/280
See application file for complete search history.

(56) References Cited

U.S. PATENT DOCUMENTS

| | | | | |
|---|---|---|---|---|
| 3,001,547 | A * | 9/1961 | Brumbaugh | ............. 137/614.17 |
| 7,096,887 | B2 | 8/2006 | Tupa et al. | |
| 7,607,426 | B2 * | 10/2009 | Deng | ......................... 126/116 A |
| 7,641,470 | B2 * | 1/2010 | Albizuri | .......................... 431/12 |
| 7,942,164 | B2 * | 5/2011 | Hsiao | ....................... 137/625.47 |
| 7,967,005 | B2 * | 6/2011 | Parrish | ............................ 126/42 |
| 2005/0202361 | A1 | 9/2005 | Albizuri | |
| 2006/0175566 | A1 | 8/2006 | Albizuri | |
| 2010/0154777 | A1 | 6/2010 | Carvalho et al. | |
| 2011/0143294 | A1 * | 6/2011 | Deng | ............................ 431/279 |

* cited by examiner

*Primary Examiner* — Jessica Cahill
(74) *Attorney, Agent, or Firm* — Tim L. Kitchen; Peter B. Scull; Hamilton, DeSanctis & Cha, LLP (57) ABSTRACT

Regulation valve for a gas cooking appliance adapted for the supply of first and second different types of fuel gas, such as natural gas or liquefied gas. The regulation valve has a valve body with an inlet conduit and an outlet conduit, and a rotatable regulating organ housed in the valve body. The regulating organ has a plurality of inlet holes connected to the inlet conduit which, by means of the rotation of said regulating organ allow a gas flow to be altered, the inlet holes of the regulating organ corresponding to the first type of fuel gas are in a first axial position and the inlet holes corresponding to the second type of fuel gas are in a second axial position.

20 Claims, 10 Drawing Sheets

REGULATION VALVE FOR A GAS COOKING APPLIANCE

CROSS-REFERENCE TO RELATED APPLICATIONS

This application relates to and claims the benefit and priority to Spanish Patent Application No. U201230338, filed Mar. 27, 2012.

TECHNICAL FIELD

The present disclosure relates to gas valves that include a rotatable regulating organ, fitted in a gas cooking appliance, and to the means for regulating the flow rate according to the gas type used.

BACKGROUND

There are known gas valves for household cooking appliances that use a single valve for regulating the flow of two different gas types, such as natural gas (NG) and liquefied petroleum gas (LPG).

US 2006/0175566 A1 describes a gas valve for a household cooking appliance, which may be supplied by different types of gas: natural gas (NG) or liquefied gas (LPG). The valve comprises a valve body that comprises an inlet conduit and an outlet conduit, and a rotatable regulating organ housed in the valve body. The regulating organ has two successive minimum-flow inlet holes spaced in the rotational direction, one for natural gas (NG) and the other for liquefied gas (LPG). The regulating organ is situated, in its minimum-flow position, with the minimum-flow inlet hole corresponding to the type of gas to be used, natural (NG) or liquefied (LPG), aligned with the inlet conduit. Depending on whether a stop is included or not, one or the other minimum-flow inlet hole is aligned with the inlet conduit in the minimum-flow position.

US 2005/0202361 A1 discloses a gas valve for a household cooking appliance, which may be supplied by different types of gas, natural gas (NG) or liquefied gas (LPG), and which comprises a regulating organ such as the one described in US 2006/0175566 A1. The outlet conduit of this gas valve comprises a restrictor disc with a calibrated hole for the maximum flow of natural gas (NG), and a detachable nozzle with a calibrated hole for the maximum flow of liquefied gas (LPG), substantially smaller than the calibrated hole for natural gas (NG). To use natural gas (NG) the detachable nozzle is removed, and to use liquefied gas (LPG) it is fitted on the outlet conduit.

SUMMARY OF THE DISCLOSURE

According to some implementations, a regulation valve is provided for the supply of different types of gas, such as, for example natural gas (NG) or liquefied gas (LPG), and comprises a valve body with an inlet conduit and an outlet conduit, a rotatable regulating organ housed in the valve body, the regulating organ comprising a plurality of inlet holes connected to the inlet conduit which, by means of the rotation of the regulating organ, allow a gas flow "Q" to be altered. The inlet holes of the regulating organ corresponding to a first type of gas are in a first axial position, and the inlet holes corresponding to a second type of gas are in a second axial position.

As a result of the inlet holes corresponding to each type of gas being disposed in different axial positions of the regulating organ, they allow the gas flow "Q" of each type of gas to be altered independently.

In the prior art, as the inlet holes of the different types of gases share the same axial position, it is necessary to set two different minimum-flow positions and add, replace or remove a stop element depending on the type of gas selected. With the regulation valves disclosed and contemplated herein it is not necessary to add, replace or remove any element to ensure that the regulating organ is correctly aligned, regardless of the type of gas used.

These and other advantages and characteristics will be made evident in the light of the drawings and the detailed description thereof.

DETAILED DESCRIPTION

Figure 1:
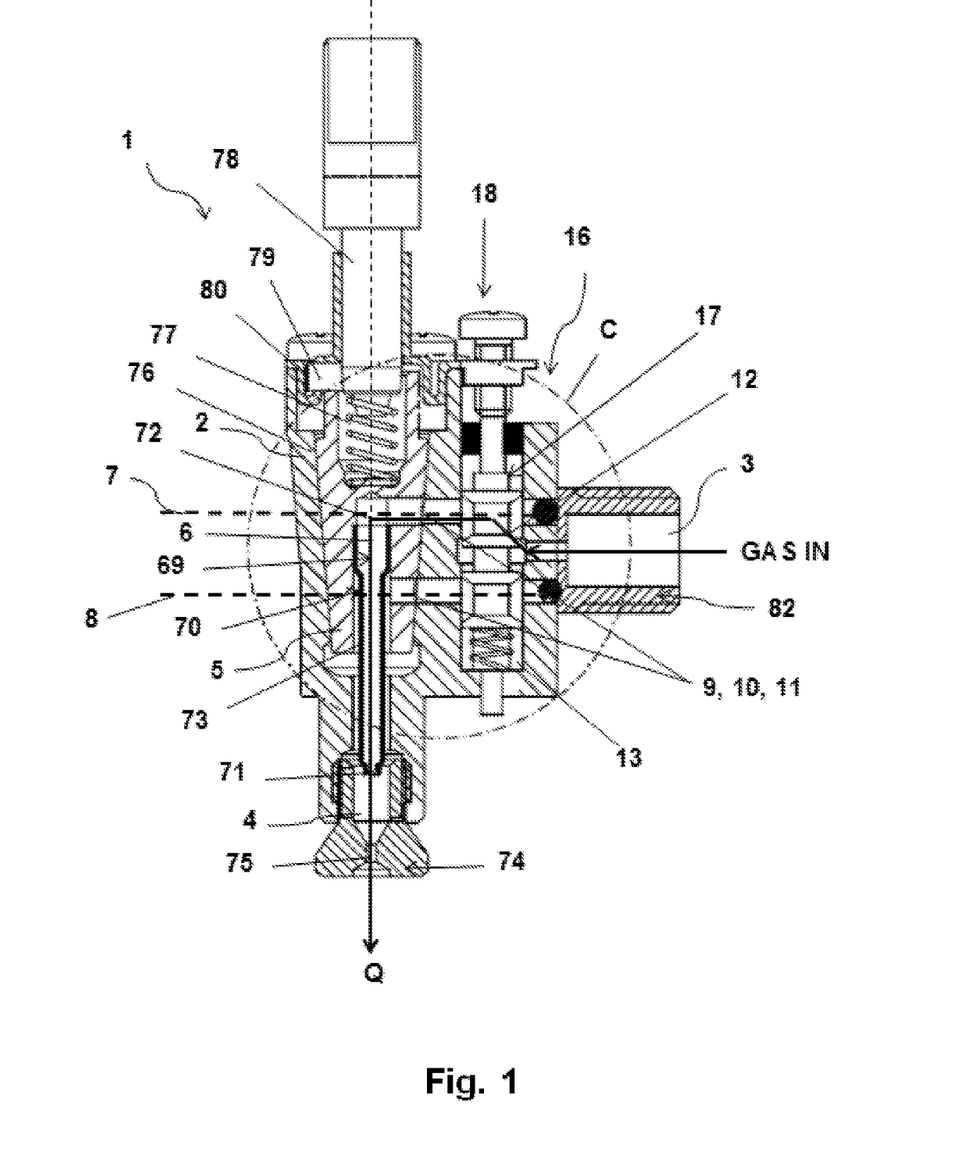
FIG. 1 shows a sectional view of a first implementation of a gas valve adapted for liquefied gas (LPG).

A gas cooking appliance, such as a barbecue, may be of a different type depending on the type of gas used from an external GAS IN source, such as, for example either natural gas (NG) or liquefied petroleum gas (LPG). In the gas cooking appliance one or more regulation valves 1 are fitted. FIG. 1 shows a sectional view of a first implementation of a regulation valve for a gas cooking appliance capable for use with the supply of natural gas (NG) or liquefied gas (LPG), and adapted for liquefied gas (LPG). The valve 1 comprises a valve body 2 with an inlet conduit 3 connected to the external GAS IN gas source, and an outlet conduit 4. The regulation valve 1 also comprises a regulating organ 5 rotating around a central shaft 6, and housed in the valve body 2, the regulating organ 5 comprising a plurality of inlet holes connected to the inlet conduit 3, which, by means of the rotation of the regulating organ 5, allow a gas flow "Q" directed to a burner adapted to one or another fuel gas to be altered. The inlet holes of the regulating organ 5 corresponding to a first type of gas, such as liquefied gas (LPG), are in a first axial position 7 in the direction of the exit of the gas towards the outlet conduit 4, and the inlet holes corresponding to a second type of gas, such as natural gas (NG), are in a second axial position 8 in the direction of the exit of the gas towards the outlet conduit 4 and closest to this outlet conduit 4.

Figure 2:
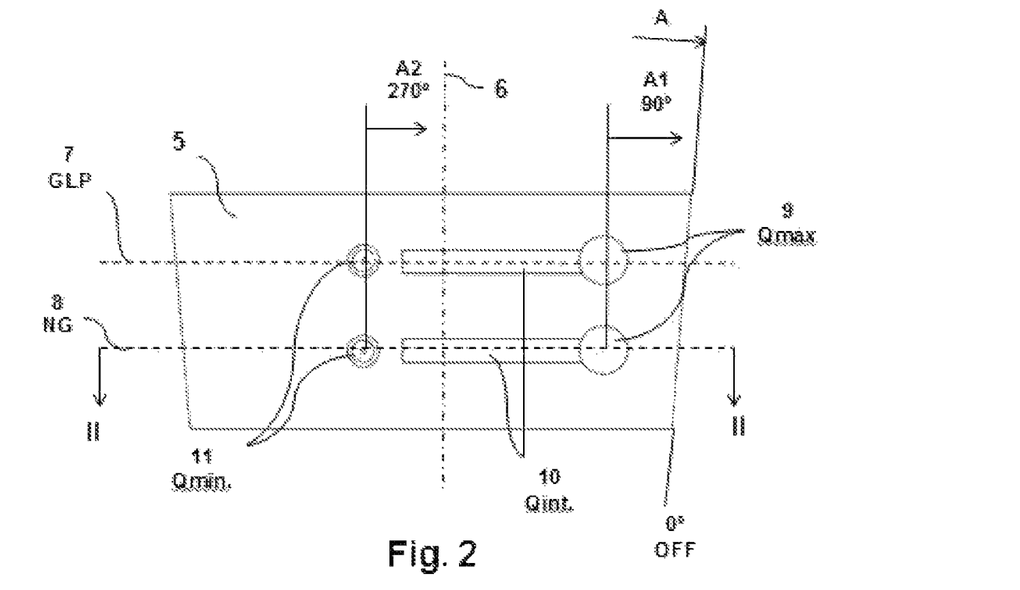
FIG. 2 shows a development view of the regulating organ of the valve of FIG. 1.
Figure 3:
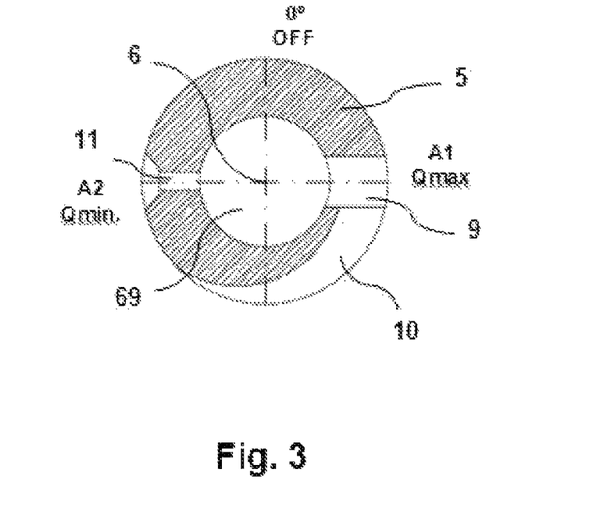
FIG. 3 shows a sectional view of the regulating organ of the valve along the II-II line of FIG. 2.

FIGS. 2 and 3 respectively show a development view of the regulating organ 5 of the valve 1 of FIG. 1, and a sectional view of the regulating organ 5 of the valve 1 along the II-II line of FIG. 2. According to some implementations the inlet holes of the regulating organ 5 corresponding to each type of gas, which are located in different axial positions 7 and 8, comprise a first hole 9 corresponding to a maximum flow $Q_{Max}$, a progressive groove 10 corresponding to a descending intermediate flow $Q_{Int}$, and a third hole 11 corresponding to a minimum flow $Q_{Max}$, in correspondence with different angular positions A1, A1-A2 and A2, from an initial "OFF" position, the angular position "A" corresponding to each hole of the same flow level of each type of gas being the same. The regulating organ 5 may rotate by an angle "A", usually an angle "A" greater than 180° and smaller than 360°, which in the implementation shown is 270°, from an initial angular "OFF" position situated at 0°, in which the valve 1 is closed. In FIG. 2 the regulating organ 5 rotates to an angular position A1 at 90°, for the supply of a maximum flow $Q_{Max}$ of any NG or LPG gas. The flow $Q_{Max}$ is regulated by a first hole 9 in the regulating organ 5, facing the inlet conduit 3. If the rotation of the regulating organ 5 continues between the angular position A1 at 90° and an angular position A2 at 270°, an intermediate flow $Q_{Int}$ is supplied through a progressive groove 10 that has a decreasing area that may be disposed between the angular positions A1 and A2. Depending on the angle "A" rotated, a third hole 11 for supplying a minimum flow $Q_{Min}$ faces the inlet conduit 3 in an angular position A2 to 270°. The diameter of the third hole 11 is calibrated for the supply of the minimum gas flow $Q_{Min}$.

Figure 4:
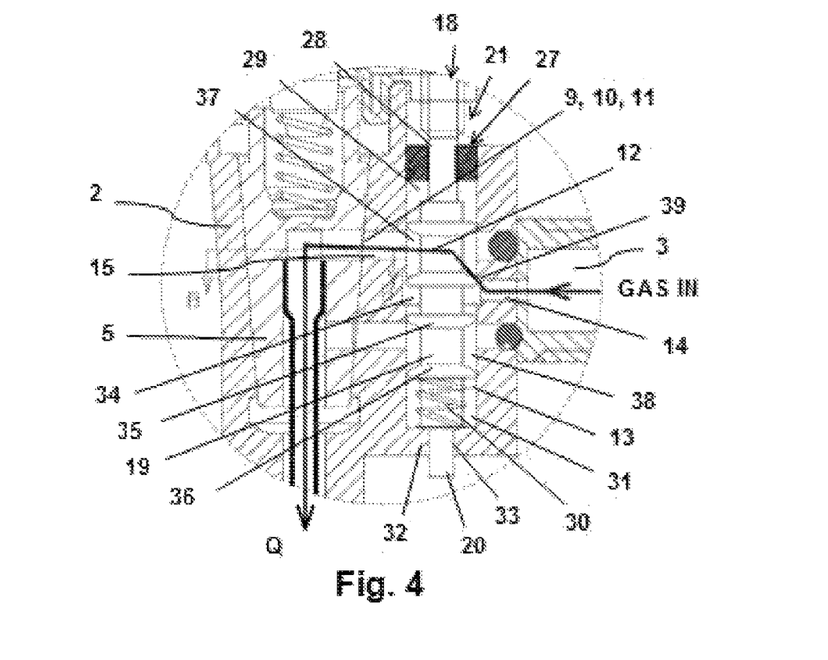
FIG. 4 shows a detailed view of the area according to the circle C of the implementation of the valve of FIG. 1 adapted for liquefied gas (LPG).
Figure 5:
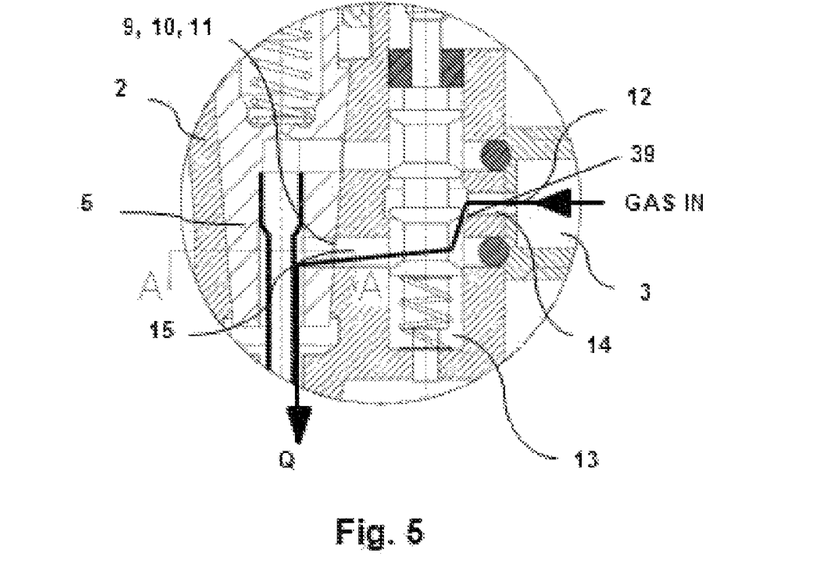
FIG. 5 shows a detailed view of the area according to the circle C of the implementation of the valve of FIG. 1 adapted for natural gas (NG).

FIG. 4 shows a detailed view of the area according to the circle C of the implementation of the valve of FIG. 1 adapted for liquefied gas (LPG), and FIG. 5 shows a detailed view of the area according to the circle C of the implementation of the valve of FIG. 1 adapted for natural gas (NG). In the implementation of the valve shown in FIGS. 4 and 5, the flow of each type of gas, liquefied (LPG) and natural (NG), takes a different path 12 from the inlet conduit 3 to the inlet holes 9-11 of the regulating organ 5 corresponding to the type of gas.

In order to differentiate the path 12 of the two types of gases, the valve body 2 comprises a substantially cylindrical housing 13 inserted in the path 12 of the flow of each type of gas, the housing 13 comprising at least one inlet hole 14 that connects the inlet conduit 3 to the housing 13, and an outlet hole 15 for each type of gas that connects the housing 13 to the inlet holes 9-11 of the regulating organ 5 corresponding to the type of gas.

The regulation valve 1 of the first implementation comprises, as shown in FIG. 1, a selection means 16 that enables the user to operate the valve 1 in a simple manner, with the aid merely of a common tool such as a screwdriver, which allows them to regulate the valve to a defined gas. The selection means 16 is configured to select the path 12 corresponding to the type of gas defined in the regulation valve 1, the selection means 16 comprising a body 17 housed in the housing 13 of the valve body 2, which allows the passage of gas along the selected path 12, and a regulation unit 18 that allows the selection of the type of gas.

The selection means 16 of the regulation valve 1 of FIG. 1 is shown in detail in FIGS. 4 and 5. The body 17 of the selection means 16 comprises a central body 19 that may be moved axially along the housing 13, which is in some implementations substantially cylindrical. The central body 19 comprises along its length a plurality of circular segments connected and transversal to the central body 19, with a greater diameter, separated from each other, and which are fitted on their outer diameter to the inner walls of the housing 13. According to some implementations these circular segments have an ending on their outer diameter in the form of a wedge with a rounded end, with the result that the contact with the walls of the housing 13 is made on an edge, thus enhancing the sliding effect and maintaining the seal between the spaces separating the segments. According to some implementations these segments have a coating with a sliding, abrasion-resistant material, which may be formed, for example, in a vulcanising process with silicon or viton. The body 17 of the selection means 16 also comprises two lateral bodies 20 that are substantially cylindrical, each one of the lateral bodies 20 coming out of one end of the central body 19 in an axial direction and centred on the same axial shaft, with a smaller diameter than the diameter of the central body 19.

Figure 8:
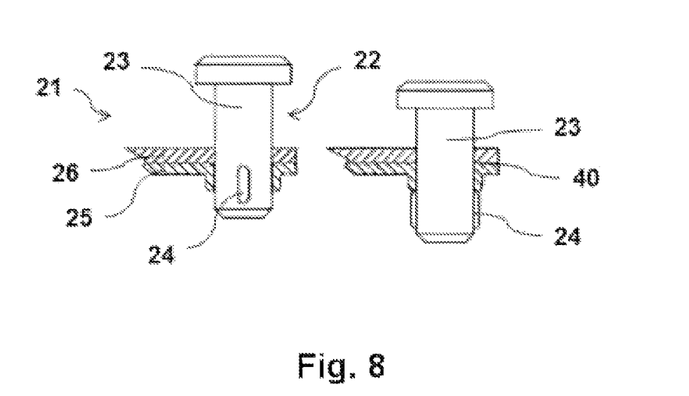
FIG. 8 shows a sectional view of the regulation element of the valve of the implementation of FIGS. 1 to 5.

The regulation unit 18 of the selection means 16 may be disposed in an active position and in a passive position. In order to achieve these positions, the regulation unit 18 comprises a regulation element 21, which comprises a retainer element 22, which may be a bolt, a screw or a similar retainer element, which is adapted to engage one end of the upper lateral body 20. FIG. 8 shows an implementation of the regulation element 21 in a sectional view. In this implementation the retainer element 22 of the regulation element 21 comprises a body 23 out of which laterally emerge, in a radial direction in a section of the length of the body 23, two protuberances 24, the protuberances 24 being separated by 180°. The retainer element 22 is housed in a space 40, preferably a hole, which forms in an overlapping manner a cover 25 of the valve body 2 and a retainer cap 26 that forms part of the regulation element 21. The cover 25 and the retainer cap 26 present a hole that allows the passage of the retainer element 22, and which allows cooperation with the retainer element 22 when the regulation unit 18 is disposed in the active position and in the passive position. The regulation unit 18, as shown in FIGS. 4 and 5, also comprises a substantially cylindrical retainer disc 27, and with a central hole 28 on the axial shaft, the retainer disc 27 being housed, either pressed or threaded into the valve body 2 in one end 29 of the housing 13, the central hole 28 allowing the passage of the upper lateral body 20 of the body 17 in a sliding manner. According to some implementations the regulation unit 18 also comprises an elastic means 30, preferably a spring, the elastic means 30 being housed in one end 31 of the housing 13 opposite the housing of the retainer disc 27. The elastic means 30 is supported at one end on one of the segments of the central body 19 and at the other end in a base 32 of the valve body 2 disposed on the end 31 of the housing 13, the elastic means 30 surrounding the central body 19. The base 32 of the valve body 2 comprises a hole 33 disposed centred with the axial shaft of the body 17, the hole 33 allowing the passage of the lower lateral body 20 of the body 17 in a sliding manner.

The housing 13 of the valve body 2 comprises a central chamber 34 with a larger diameter than the diameter of the housing 13, the central chamber 34 connecting laterally to the inlet hole 14. The segments, which in this implementation are four in total, comprise two central segments 35 that in the axial movement of the body 17 move opposite the inlet hole 14 and along the central chamber 34, and two lateral segments 36, each one between each end of the central body 19 and one of the central segments 35, each lateral segment 36 forming with each corresponding central segment 35 and with the housing 13, lateral chambers 37 and 38 corresponding to the first type of gas and to the second type of gas respectively.

When the regulation unit 18 is disposed in the active position, the retainer element 22 is pressed and rotates 90°, the protuberances 24 cooperating with the cover 25 of the valve body 2 and thereby retaining the retainer element 22. In this active position the body 17 moves to a position in which one of the central segments 35 is fitted to the walls of the housing 13, and the other central segment 35 leaves an opening 39 between the central chamber 34 and the wall of the housing 13, the flow of the first type of gas being capable of passing from the inlet hole 14. The flow of gas passes to the lateral chamber 37 corresponding to the first type of gas, and from here to the outlet hole 15 of housing 13. When the regulation unit 18 is disposed in the passive position, the retainer element 22 is pressed and rotates 90° again, the protuberances 24 are released from their cooperation with the cover 25, and the retainer element 22 is thus released. The elastic means 30 pushes and moves the body 17 until the central body 19 comes up against the retainer disc 27 and the protuberances 24 cooperate with the retainer cap 26, retaining the retainer element 22. In the passive position one of the central segments 35 is fitted to the walls of the housing 13, and the other central segment 35 leaves an opening 39 between the central chamber 34 and the wall of the housing 13, the flow of the second type of gas being capable of passing from the inlet hole 14. The flow of gas passes to the lateral chamber 38 corresponding to the second type of gas, and from here to the outlet hole 15 of the gas.

In the implementation shown in FIG. 1, and in the other implementations to be shown, the regulating organ 5 of the valve 1 comprises an axial inner chamber 69, as shown in FIGS. 1 and 3, the inner chamber 69 being connected, in an independent manner, to the inlet holes corresponding to the liquefied gas LPG, with the inlet holes corresponding to the natural gas NG, and with the outlet conduit 4 of the valve body 2, as shown in FIG. 1. In the implementations shown, the inlet holes of the regulating organ 5 corresponding to the liquefied gas LPG are connected to the outlet conduit 4 of the valve body 2 by a conduit that may comprise a calibrated hole 71 for the maximum flow of liquefied gas LPG. As a result, as the liquefied gas LPG and the natural gas NG reach the outlet conduit 4 by different paths, the path corresponding to the liquefied gas (LPG) may have the calibrated hole for the maximum flow incorporated into it, without there being any need to remove or fit a nozzle with the calibrated hole in accordance with the type of gas to be used, as is the case in the prior art. In addition, according to some implementations the valve 1 comprises in the outlet conduit 4 a nozzle 74 with a calibrated hole 75 for the maximum flow of the natural gas NG. The liquefied gas LPG also passes through the nozzle 74, although this is not a problem as the calibrated hole 75 corresponding to the natural gas NG is substantially larger than the calibrated hole 71 corresponding to the liquefied gas LPG. According to some implementations the inlet holes of the regulating organ 5 corresponding to the liquefied gas LPG are disposed in the axial position 7 furthest from the outlet conduit 4 of the valve body 2, as this configuration enables the implementation of the conduit comprising the calibrated hole 71.

In the first implementation, as shown in FIG. 1, the calibrated hole 71 for the maximum flow of liquefied gas LPG is disposed on the end of a nozzle 70 fixed in the inner chamber 69 of the regulating organ 5. According to some implementations the nozzle 70 comprises a first section with a contour substantially equal to the contour of the inner chamber 69 and fixed to the inner chamber 69, and a narrower second section, the second section extending at least from the axial position 8 of the inlet holes corresponding to the natural gas NG. In this implementation, the second section of the nozzle 70 projects out of the regulating organ 5 and extends towards the outlet conduit 4. In an alternative implementation, instead of using a nozzle 70, the calibrated hole 71 for the maximum flow of liquefied gas LPG may be disposed in a restrictor disc 70a housed in the inner chamber 69 between the first axial position 7 and the second axial position 8, as shown for example in FIG. 6. The nozzle 70 or the restrictor disc 70a may be housed in the inner chamber 69 under pressure or by threading.

Figure 6:
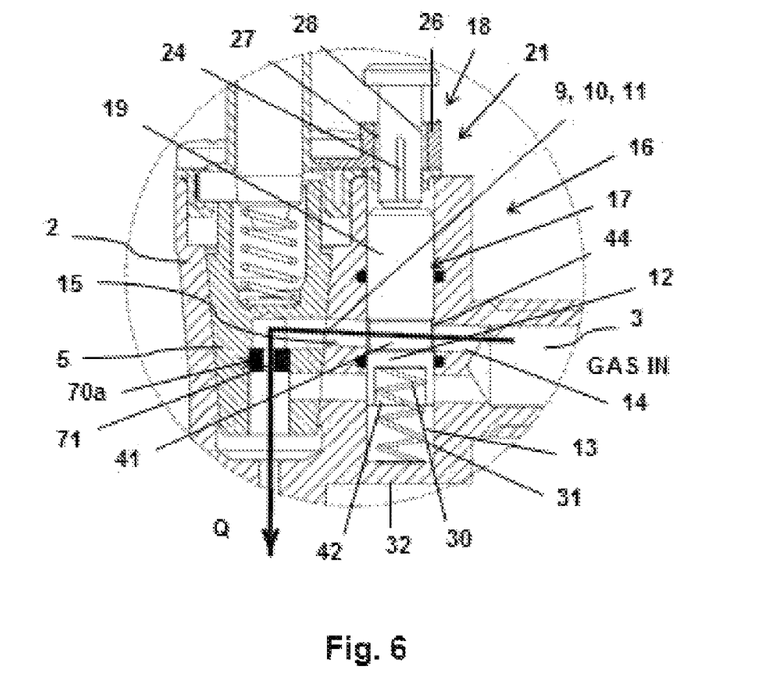
FIG. 6 shows a detailed view of a second implementation of the gas valve adapted for liquefied gas (LPG).
Figure 7:
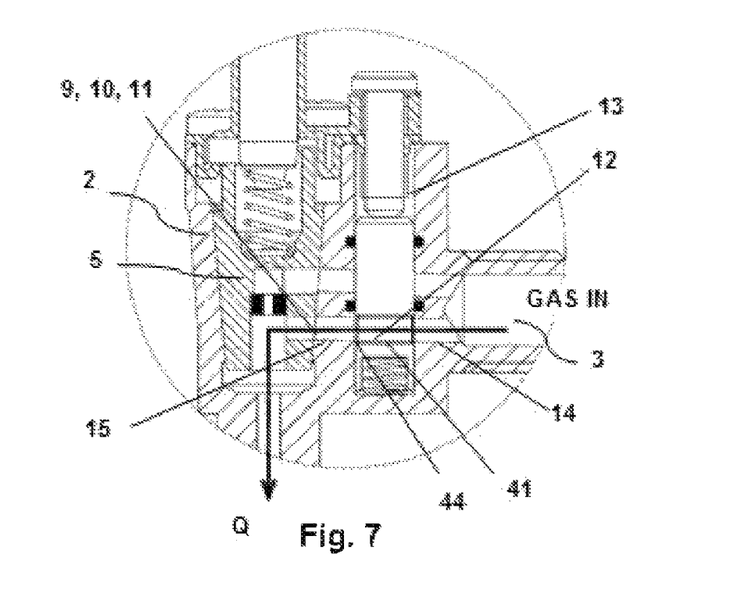
FIG. 7 shows a detailed view of the implementation of FIG. 6 adapted for natural gas (NG).

FIGS. 6 and 7 show a detailed view of a second implementation of the selection means 16, the valve 1 adapted for liquefied gas (LPG) being shown in FIG. 6, and adapted for natural gas (NG) in FIG. 7. In this second implementation, the body 17 of the regulation valve 1 comprises a substantially cylindrical central body 19 that is fitted on its outer diameter to the inner walls of the housing 13 and may be moved axially along the housing 13, the central body 19 comprising a hole 41 that passes through it in a radial direction. The central body 19 is disposed in the implementation shown with a reduction of its diameter in the area where the hole 41 is situated, centred in the axis of the hole and with a height somewhat greater than its diameter, forming a gas chamber 44 between the wall of the housing 13 and the surface of the central body 19.

Figure 9:
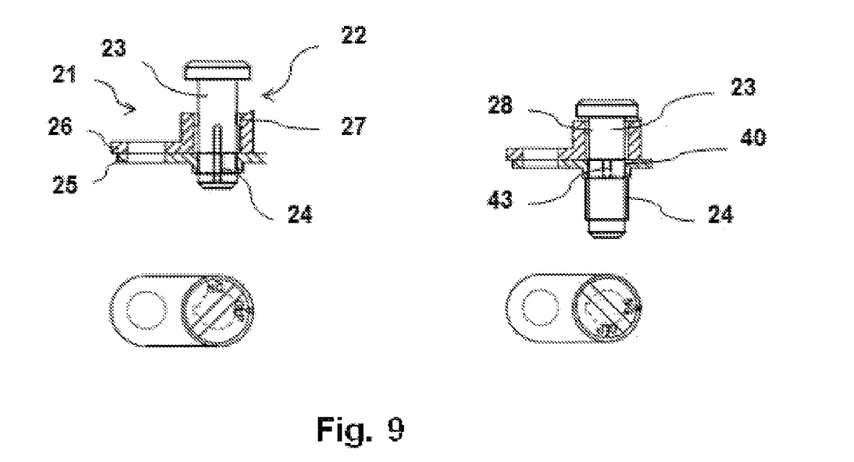
FIG. 9 shows a sectional view of the regulation element of the valve of the implementation of FIGS. 6 and 7.

The regulation unit 18 of the selection means 16 may be disposed in an active position and in a passive position. In order to achieve these positions, in this implementation the regulation unit 18 comprises a regulation element 21, which comprises a retainer element 22, which may be a bolt, a screw or a similar retainer element, which engages one end of the central body 19. This regulation element 21 is shown in FIG. 9 in a sectional view. According to some implementations the retainer element 22 comprises a body 23 out of which laterally emerge, in a radial direction in a section of the length of the body 23, two protuberances 24, the protuberances 24 being separated by 180°. The retainer element 22 is housed in a space 40, preferably a hole, which form in an overlapping manner a cover 25 of the valve body 2 and a retainer cap 26 that forms part of the regulation element 21. The cover 25 and the retainer cap 26 present a hole that allows the passage of the retainer element 22 to the inside of the housing 13 of the valve body 2.

The regulation unit 18, as shown in FIGS. 6 and 7, also comprises a substantially cylindrical retainer disc 27, and with a central hole 28 on the axial shaft, the retainer disc 27 being housed, either pressed or threaded, in an outer end of the retainer cap 26, the central hole 28 and the space 40 allowing the passage of the retainer element 22 in a sliding manner. The regulation unit 18 may also comprise an elastic means 30, preferably a spring, the elastic means 30 being housed in one end 31 of the housing 13 opposite the housing of the retainer element 22. The elastic means 30 is supported at one end in the base 32 of the housing 13 and at the other end it is housed in a housing 42 of the end of the central body 19.

When the regulation unit 18 is disposed in the active position, the retainer element 22 rotates 90°, the protuberances 24 cooperating with the cover 25 of the valve body 2, and thereby retaining the retainer element 22. In this active position the central body 19 moves to a position in which the hole 41 of the central body 19 coincides with one of the inlet holes 14 and one of the outlet holes 15 of the housing 13, allowing the passage of the flow of the second type of gas through the gas chamber 44.

When the regulation unit 18 is disposed in the passive position, the retainer element 22 rotates 90° again, and the protuberances 24 are released from their cooperation with the cover 25, releasing the retainer element 22. The elastic means 30 pushes and moves the central body 19 and this in turn moves the retainer element 22, the protuberances 24 of which pass through channels 43 in the cover 25, as shown in FIG. 9, until the protuberances 24 of the retainer element 22 come up against the retainer disc 27, retaining the retainer element 22. In this passive position the hole 41 of the central body 19 coincides with the other inlet hole 14 and the other outlet hole 15 of the housing 13, allowing the flow of the first type of gas to pass through the gas chamber 44.

Figure 10:
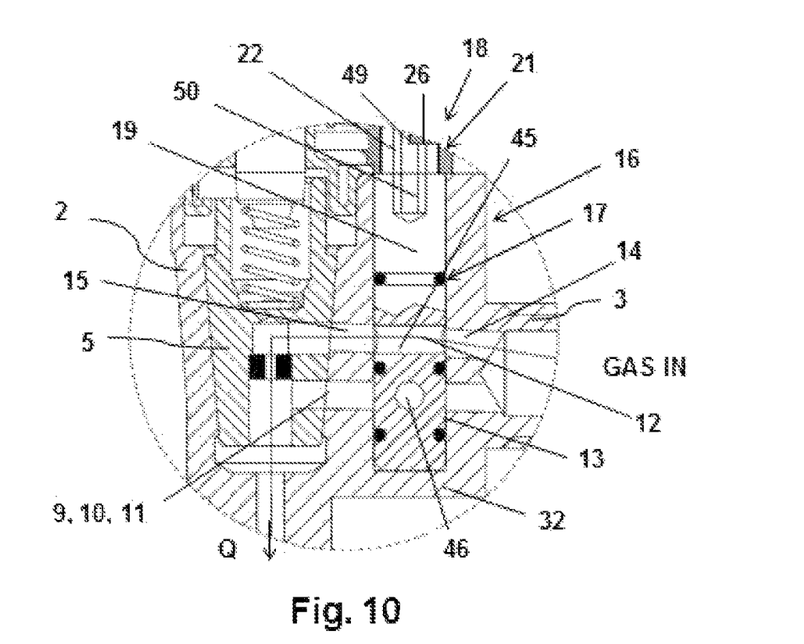
FIG. 10 shows a detailed view of a third implementation of the gas valve adapted for liquefied gas (LPG).
Figure 11:
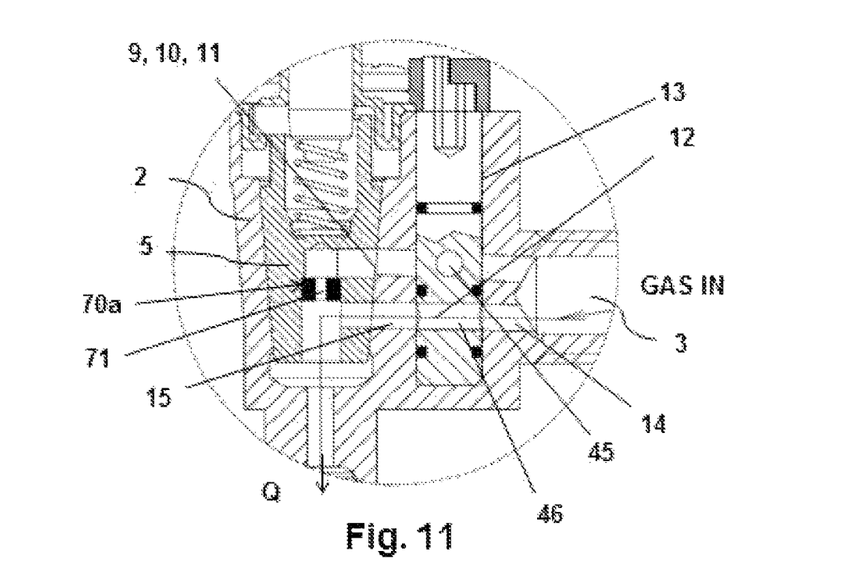
FIG. 11 shows a detailed view of the implementation of FIG. 10 adapted for natural gas (NG).
Figure 16:
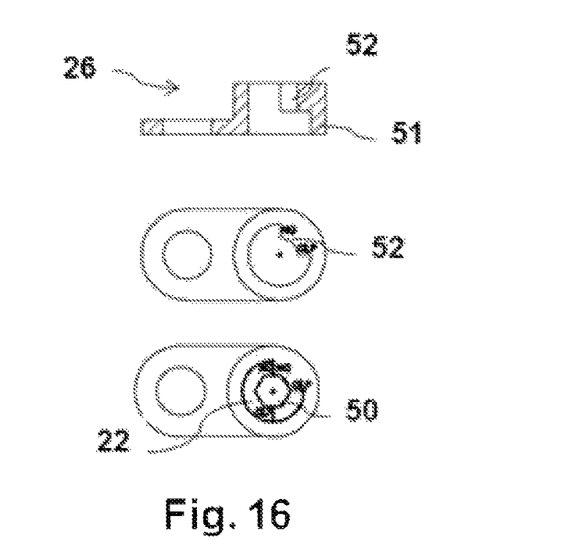
FIG. 16 shows a sectional view and a plan view of the retainer cap of the implementations of FIGS. 10, 11, 12 and 13.

FIGS. 10 and 11 show a detailed view of a third implementation of the selection means 16, the valve 1 being adapted in FIG. 10 to liquefied gas (LPG), and being adapted in FIG. 11 to natural gas (NG). In this third implementation, the body 17 of the regulation valve 1 comprises a substantially cylindrical central body 19, that is fitted on its outer diameter to the inner walls of the housing 13, and is supported at one end in a base 32 of the housing 13 of the valve body 2, the central body 19 comprising two holes 45 and 46 that pass through it in a radial direction, moved along the axial axis of the central body 19, and rotated between them by an angle, preferably 90°. The regulation unit 18 of the selection means 16 may be disposed in an active position and in a passive position. In order to achieve these positions, the regulation unit 18 comprises a regulation element 21, according to some implementations the regulation element 21 comprising a retainer element 22 connected to one end of the central body 19, which projects out of the housing 13 of the valve body 2, with a projection 49 in an axial direction, forming an outer wall in a section of the circumference, preferably 180°, and with a housing 50 in the centre of the retainer element 22 and in an axial direction that allows it to be operated with a tool. The regulation element 21 may also comprise a retainer cap 26 with a hollow cylindrical area 51 that projects out of the surface of the cap and which allows the guiding of the retainer element 22, which projects out of the housing 13, the cylindrical area 51 being disposed with a projection 52 in its upper part and which projects out towards the inside, in an axial direction fitting together with the projection 49 of the retainer element 22, and in a radial direction in an angular section, preferably 90°, between the outer circumference and the centre, this projection 52 allowing a rotation of 90° of the retainer element 22. This retainer cap 26 is shown in FIG. 16 in a sectional view.

When the regulation unit 18 is disposed in the active position, the retainer element 22 rotates 90°, the projection 49 of the retainer element 22 cooperating with the projection 52 of the retainer cap 26, and thereby retaining the retainer element 22 and with it the central body 19. In this active position the central body 19 moves to a position in which the hole 46 of the central body 19 coincides with one of the inlet holes 14 and one of the outlet holes 15 of the housing 13, allowing the flow of the second type of gas to pass.

When the regulation unit 18 is disposed in the passive position, the retainer element 22 rotates 90° again in an opposite direction, the projection 49 of the retainer element 22 cooperating with the other face of the projection 52 of the retainer cap 26, and thereby retaining the retainer element 22 and with it the central body 19. In this passive position the central body 19 moves to a position in which the hole 45 of the central body 19 coincides with the other inlet hole 14 and the other outlet hole 15 of the housing 13, allowing the flow of the first type of gas to pass.

Figure 12:
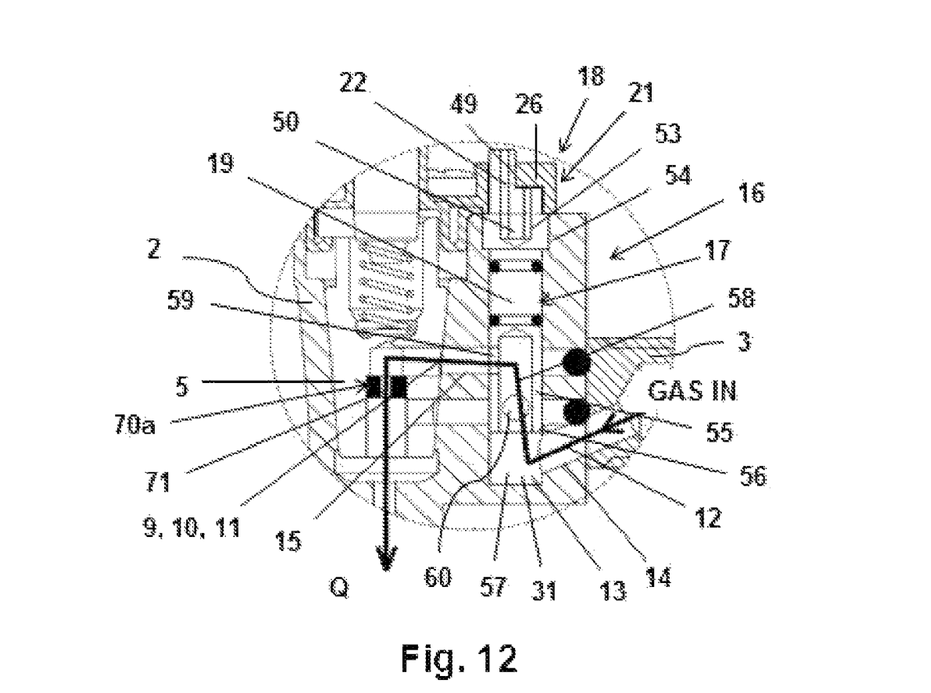
FIG. 12 shows a view of a fourth implementation of the gas adapted for liquefied gas (LPG).
Figure 13:
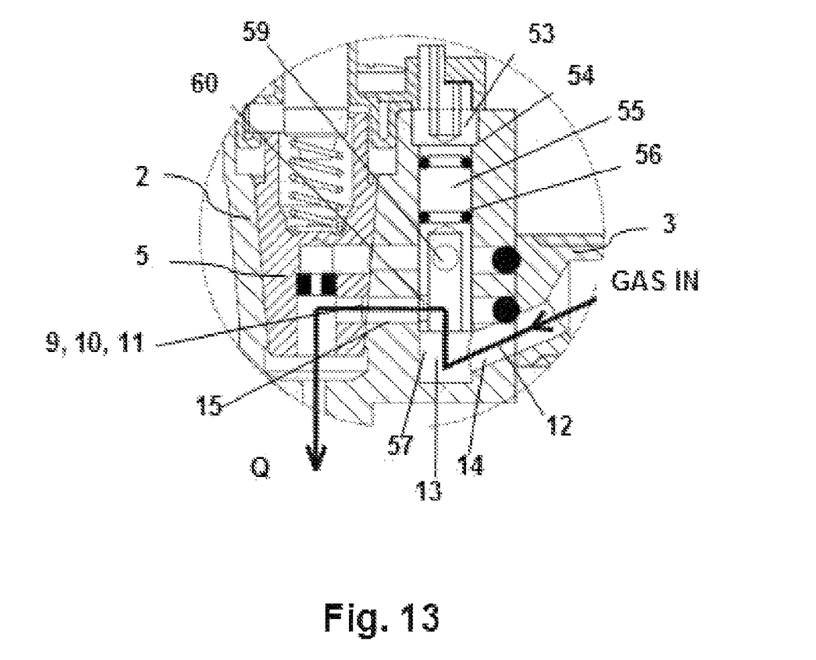
FIG. 13 shows a detailed view of the implementation of FIG. 12 adapted for natural gas (NG).

FIGS. 12 and 13 show a detailed view of a fourth implementation of the selection means 16, the valve 1 being adapted in FIG. 12 to liquefied gas (LPG), and being adapted in FIG. 13 to natural gas (NG). In this fourth implementation the body 17 of the regulation valve 1 comprises a substantially cylindrical central body 19, which fits on its outer diameter to the inner walls of the housing 13, the central body 19 comprising two sections in its length with different diameters, a section 53 with a larger diameter that fits in a section 54 of the housing 13 also with a greater diameter, and a section 55 with a smaller diameter that fits in a section 56 of the housing 13 also with a smaller diameter, with the result that the central body 19 is supported in the section 54 of the housing 13 being supported in it, there existing a space between the end of the main body 19 and the end 31 of the housing 13 that forms a gas chamber 57 that connects laterally with the inlet hole 14. The central body 19 comprises a hole 58 along its axial shaft and in a section of its length, which connects at one end with the gas chamber 57, and with a smaller diameter than the diameter of the central body 19, and two holes 59 and 60 that perforate it in a radial direction until it connects with the hole 58, the holes 59 and 60 being moved along the axial shaft of the central body 19, along the section of the length of the hole 58, and rotated between them by an angle, preferably 90°.

The regulation unit 18 of the selection means 16 may be disposed in an active position and in a passive position. In order to achieve these positions, the regulation unit 18 comprises a regulation element 21, according to some implementations the regulation element 21 comprising a retainer element 22 connected to one end of the central body 19, which projects out of the housing 13 of the valve body 2, with a projection 49 in an axial direction, forming an outer wall in a section of the circumference, preferably 180°, and with a housing 50 in the centre of the retainer element 22 and in an axial direction that allows it to be operated with a tool. The regulation element 21 may also comprise a retainer cap 26 with a hollow cylindrical area 51 that projects out of the surface of the cover and which allows the guiding of the retainer element 22 that projects out of the housing 13, the cylindrical area 51 being disposed with a projection 52 in its upper part and which projects out towards the inside, in an axial direction fitting together with the projection 49 of the retainer element 22, and in a radial direction in an angular section, preferably 90°, between the outer circumference and the centre, this projection 52 allowing a rotation of 90° of the retainer element 22. This retainer cap 26 is shown in FIG. 16 in a sectional view.

When the regulation unit 18 is disposed in the active position, the retainer element 22 rotates 90°, the projection 49 of the retainer element 22 cooperating with the projection 52 of the retainer cap 26, and thereby retaining the retainer element 22 and with it the central body 19. In this active position the central body 19 moves to a position in which the hole 59 of the central body 19 coincides with one of the outlet holes 15, allowing the flow of the first type of gas to pass through the gas chamber 57 and the hole 58.

When the regulation unit 18 is disposed in the passive position, the retainer element 22 rotates 90° again in an opposite direction, the projection 49 of the retainer element 22 cooperating with the other face of the projection 52 of the retainer cap 26, and thereby retaining the retainer element 22 and with it the central body 19. In this passive position the central body 19 moves to a position in which the hole 60 of the central body 19 coincides with the other outlet hole 15, allowing the flow of the second type of gas to pass through the gas chamber 57 and the hole 58.

Figure 14:
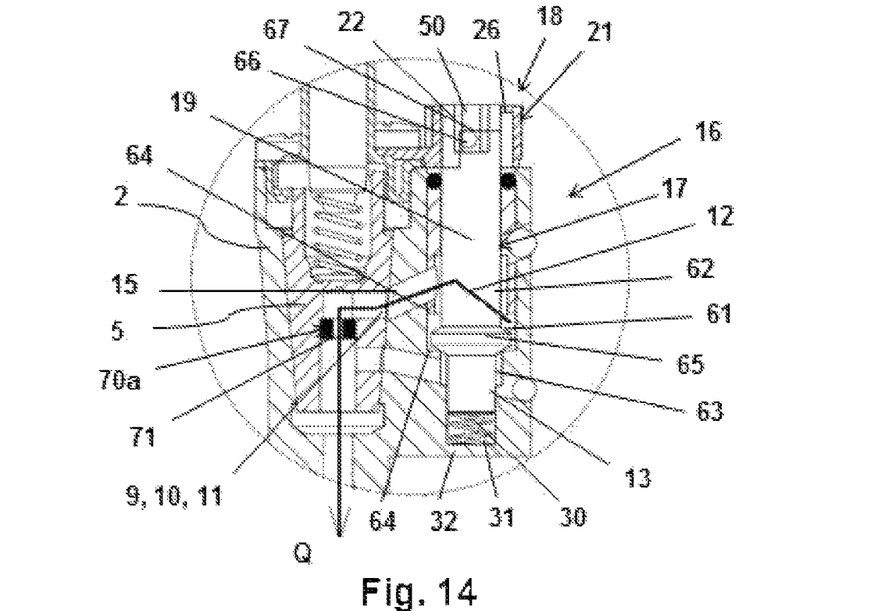
FIG. 14 shows a detailed view of a fifth implementation of the gas valve adapted for liquefied gas (LPG).
Figure 15:
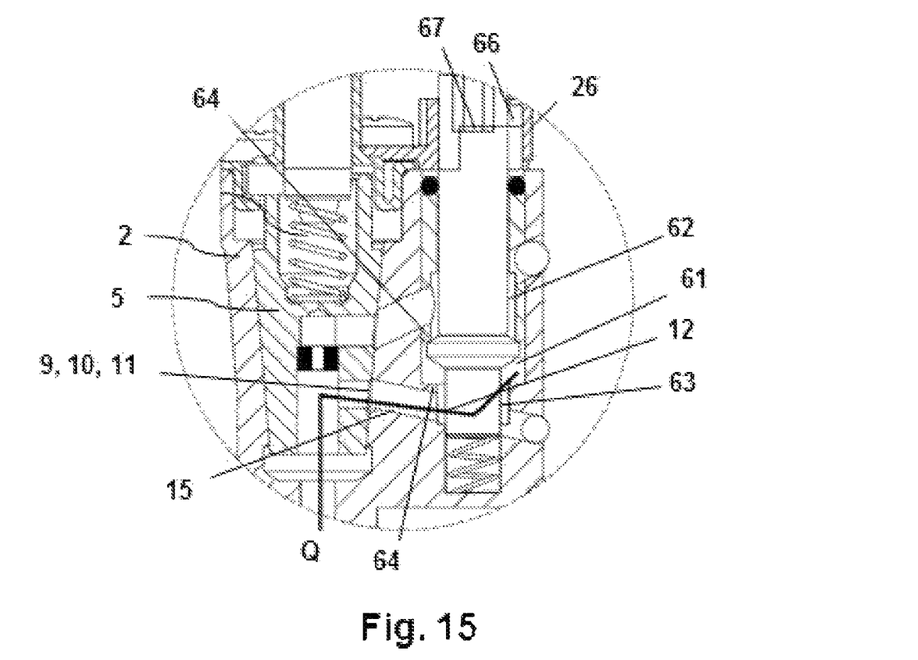
FIG. 15 shows a detailed view of the implementation of FIG. 14 adapted for natural gas (NG).

FIGS. 14 and 15 show a detailed view of the area according to the circle C of the valve of FIG. 1 in a fifth implementation of the selection means 16, the valve 1 being adapted in FIG. 14 to liquefied gas (LPG), and being adapted in FIG. 15 to natural gas (NG). In this fifth implementation the housing 13 of the valve body 2 comprises a central chamber 61 with a larger diameter than the diameter of the housing 13, the central chamber 61 connecting laterally with the inlet hole 14, not shown in FIGS. 14 and 15, but shown in FIG. 20, and also comprises two lateral chambers 62 and 63, one on each side of the central chamber 61, with a larger diameter than the diameter of the housing 13, but smaller than the diameter of the central chamber 61, forming a projection 64 between each lateral chamber 62 and 63 and the central chamber 61, each one of the lateral chambers 62 and 63 connecting with each one of the outlet holes 15 corresponding to the first type of gas and to the second type of gas respectively. The body 17 comprises a substantially cylindrical central body 19, which may be displaced axially along the housing 13, projecting out of the housing 13 at one end, and being fitted on its outer diameter to the walls of the housing 13. The central body 19 comprises at least one circular segment 65 connected and transversal to the central body 19, and with a larger diameter than it, with a termination on its outer diameter in the form of a shortened wedge and with a coating with a sliding, abrasion-resistant material, which may be formed, for example, in a vulcanising process with silicon or viton. In the axial movement of the central body 19, the segment 65 moves along the central chamber 61 opposite the inlet hole 14.

Figure 17:
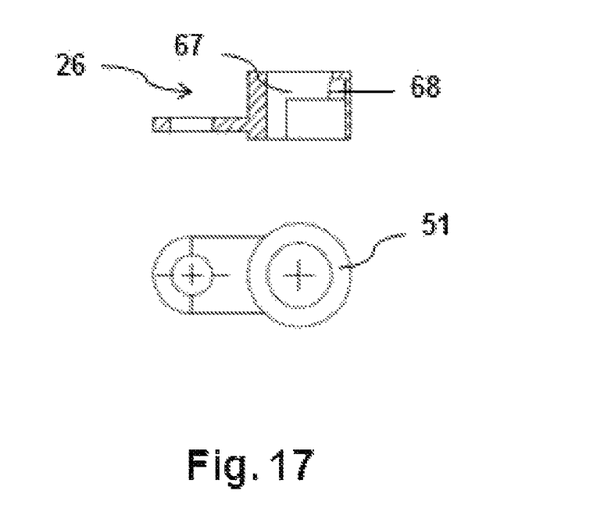
FIG. 17 shows a sectional view and a plan view of the retainer cap of the implementation of FIGS. 14 and 15.

The regulation unit 18 may be disposed in an active position and in a passive position. In order to achieve these positions, the regulation unit 18 comprises a regulation element 21, which comprises a retainer element 22 formed on the end of the central body 19, which projects out of the housing 13. This retainer element 22 comprises a pin 66, preferably a cylinder, housed in a connected manner in a hole in the lateral surface of the central body 19, and projecting out of the surface by a length, and a housing 50 in the upper surface of the end of the central body 19, in an axial direction, which allows it to be operated with a tool. The regulation element 21 also comprises a retainer cap 26 with a hollow cylindrical area 51 that projects out of the surface of the retainer cap 26, and which allows the guiding of the retainer element 22 which projects out of the housing 13. The wall of the cylindrical area 51 has the same thickness in an angular section, preferably 270°, and in the remaining angular section of 90° therefore, until the entire circumference is completed, the thickness is reduced by a height of the wall from the lower part of the cylindrical area 51 forming a first step 67, allowing the end of the pin 66 to be slid against the inner side wall of the cylindrical area 51, and to slide the lateral face of the pin 66 against the lower part of the first step 67. At the end of this angular section of 90°, the first step 67 ends in a second step 68, thereby reducing the height of the first step 67 towards the upper part of the cylindrical area 51, the pin 66 fitting in the second step 68. This retainer cap 26 is shown in FIG. 17 in a sectional view. The regulation unit 18 also comprises an elastic means 30, preferably a spring, the elastic means 30 being housed in one end 31 of the housing 13 opposite the position of the regulation element 21. The elastic means 30 is supported at one end in a base 32 of the housing 13 of the valve body 2, and at the other end in one end of the central body 19, with the result that it is fitted in the existing space between the end of the central body 19 and the bottom of the housing 13.

When the regulation unit 18 is disposed in the active position, the retainer element 22 rotates 90°, the pin 66 of the retainer element 22 cooperating with the first step 67 of the retainer cap 26, and thereby retaining the retainer element 22 and with it the central body 19. In this active position the central body 19 moves to a position in which the segment 65 is fitted with the projection 64, formed between the lateral chamber 63 and the central chamber 61, allowing the flow of the first type of gas to pass from the central chamber 61 to the lateral chamber 62 and from this to the outlet hole 15 of the type of gas.

When the regulation unit 18 is disposed in the passive position, the retainer element 22 rotates 90° again in an opposite direction, the pin 66 of the retainer element 22 cooperating with the second step 68 of the retainer cap 26, being housed in it, and thereby retaining the retainer element 22 and with it the central body 19. In this passive position the central body 19 moves to a position in which the segment 65 is fitted with the projection 64, formed between the lateral chamber 62 and the central chamber 61, allowing the flow of the second type of gas to pass from the central chamber 61 towards the lateral chamber 63 and from this to the outlet hole 15 of the type of gas.

As shown in FIG. 1, according to some implementations the regulating organ 5 of the regulation valve 1 comprises a substantially cylindrical inner gas chamber 69 that is connected to the inlet holes 9-11 and to the outlet conduit 4. This inner gas chamber 69 comprises in its interior a first restriction, which may be a nozzle 70 or a disc 70a inserted or threaded into the inner chamber 69, the first restriction 70 or 70a comprising a hole 71 in its axial shaft that passes through it, the hole 71 restricting the passage of the flow of gas. At least the gas inlet of the first restriction is disposed in the direction of the axial shaft of the inner gas chamber 69, between the inlet holes 9-11 of the regulating organ 5 corresponding to the first type of gas, and the inlet holes 9-11 corresponding to the second type of gas. As a result, the inner gas chamber 69 is divided into two chambers 72 and 73, the chamber 72 corresponding to the first type of gas disposed between the end of the inner gas chamber 69 and the first restriction 70 or 70a, and the chamber 73 corresponding to the second type of gas disposed between the first restriction 70 or 70a and the outlet conduit 4. After the first restriction 70 or 70a, and in the direction of the flow of gas, the regulation valve 1 comprises a second restriction 74, which may be a disc or a nozzle inserted or threaded into the outlet conduit 4, the second restriction 74 comprising a hole 75 in its axial shaft that passes through it, the hole 75 restricting the passage of the flow of gas. The hole 71 of the first restriction 70 or 70a determines a first maximum-flow level of the first type of gas, and the hole 74 of the second restriction determines a second maximum-flow level of the second type of gas, the first maximum-gas-flow level being lower than the second maximum-gas-flow level, with the result that if the valve 1 is adapted to the second type of gas, natural gas (NG), the flow of gas passes from the outlet hole 15 to the gas chamber 73 and from here it exits to the outside through the outlet conduit 4 through the second restriction 74 that restricts it.

If the valve 1 is adapted to the first type of gas, liquefied gas (LPG), the flow of gas moves from the outlet hole 15 to the gas chamber 72, and from here flows through the first restriction 70 or 70a, which restricts its passage, it then passing through the gas chamber 73, and from here it exits to the outside through the outlet conduit 4 through the second restriction 74, which does not restrict its passage because the first gas flow level determined by the hole 71 of the first restriction 70 or 70a is lower than the second gas flow level determined by the hole 75 of the second restriction 74.

As a result, the positioning of the inlet holes 9-11 of the regulating organ 5 in different axial positions allows the regulation of the different types of gases to be separated, and this in conjunction with the arrangement of the first and second restriction 70 and 74 in the direction of the flow of gas, the first restriction 70 being disposed axially between the inlet holes of both types of gases, allows the gas in question to be regulated without adding, replacing or removing any component, enabling the use of the regulation valve 1, its cost being reduced as it has a smaller number of components and it complying with the strictest safety regulations.

As shown in FIG. 1, the valve body 2 may have an elongated shape and may comprise a housing cavity 76 in which the regulating organ 5 is housed, the latter being pushed by a spring 77 to achieve a sealed closure, the housing cavity 76 being covered by the cover 25 of the valve body 2. In order to achieve the rotary movements of the regulating organ 5 around the central shaft 6 and regulate its angular position "A", the regulation valve 1 comprises an actuating shaft 78 connected to the regulating organ 5, a tubular sleeve 25a of the cover 25 being extended on the actuating shaft 78. The actuating shaft presents a free and configured end with the result that a control knob (not shown in the figures) may be connected to the end. The actuating shaft 78 also comprises a guide means 79, configured as a radial pin, which interacts with an end-of-stroke stop element 80, configured as a recess, which is disposed in the cover 25, the guide means 79 sliding on the smooth inner face of the cover 25 up to the recess 80, determining the end of the angular stroke A2 of the regulating organ 5, corresponding with the angular position of the third hole corresponding to the minimum flow $Q_{Min}$.

Figure 18:
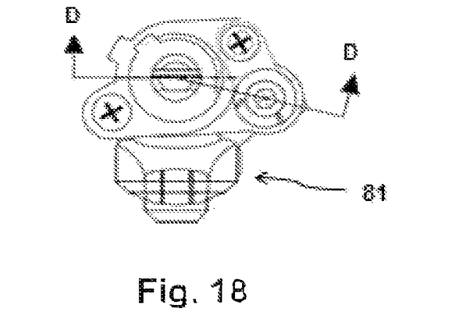
FIG. 18 shows a plan view of the valve of the implementation of FIGS. 14 and 15 with a flange-type inlet.
Figure 19:
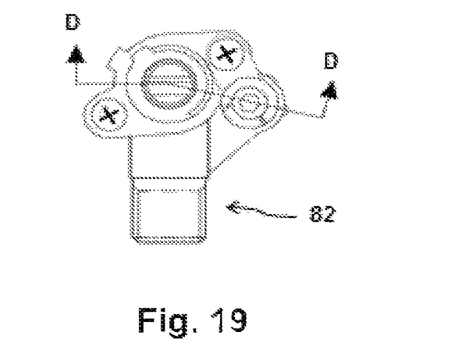
FIG. 19 shows a plan view of the valve of the implementation of FIGS. 14 and 15 with a threaded-type inlet.
Figure 20:
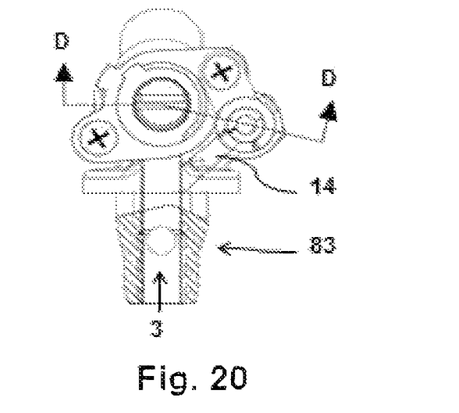
FIG. 20 shows a plan view of the valve of the implementation of FIGS. 14 and 15 with a square-type inlet shown in section.

FIGS. 18, 19 and 20 show a plan view of the fifth implementation of the valve 1 of FIG. 1 shown in FIGS. 14 and 15, with an indication of the D-D cross-section shown in the FIGS. 14 and 15. FIGS. 18, 19 and 20 show examples of the different types of inlet that the valve may have in its connection with the gas conduits (not shown in the figures). These types of inlets may be of the flange 81 type, embracing the gas conduit with two projecting flaps of the valve body 2, and the thread 82 type, threading a projection that acts as an inlet conduit 3 and which may be seen in the implementation of the valve 1 shown in FIG. 1. The projecting flaps of the flange-type inlet 81, and the threaded projection 82 are connected to the gas conduit, the gas conduit being round in both cases. And the inlet may be of the square 83 type, being connected with the assistance of a flange to square gas conduits.

What is claimed is:

1. A regulation valve for a gas cooking appliance adapted for the supply of natural gas or liquefied gas comprising:
   a valve body with an inlet conduit and an outlet conduit; and
   a regulating organ rotatable about an axis and housed in a cavity of the valve body, the cavity having a first gas inlet situated at a first axial position between the inlet conduit and the regulating organ and a second gas inlet located at a second axial position between the inlet conduit and the regulating organ, the second axial position different than the first axial position, the regulating organ including a first plurality of inlet holes corresponding to the liquefied gas disposed about the circumference of the regulating organ at the first axial position that are in fluid communication with the outlet conduit and connectable to the inlet conduit via the first gas inlet which by means of the rotation of the regulating organ allow a flow of the liquefied gas to be altered, the regulating organ including a second plurality of inlet holes corresponding to the natural gas disposed about the circumference of the regulating organ at the second axial position that are in fluid communication with the outlet conduit and connectable to the inlet conduit via the second gas inlet which by means of the rotation of the regulating organ allow a flow of the natural gas to be altered.

2. The regulation valve according to claim 1, wherein the regulating organ comprises an axial inner chamber, the inner chamber connected to the first plurality of inlet holes, the second plurality of inlet holes and to the outlet conduit of the valve body.

3. A regulation valve according to claim 2, wherein the first plurality of inlet holes of the regulating organ are connected to the outlet conduit of the valve body by a conduit that comprises a hole calibrated for the maximum flow of liquefied gas.

4. A regulation valve according to claim 3, wherein the first plurality of inlet holes of the regulating organ are axially disposed further from the outlet conduit of the valve body than the second plurality of inlet holes of the regulating organ.

5. A regulation valve according to claim 4, wherein the hole calibrated for the maximum flow of liquefied gas is disposed in a restrictor disc housed in the inner chamber between the first axial position and the second axial position.

6. A regulation valve according to claim 4, wherein the hole calibrated for the maximum flow of liquefied gas is disposed on the end of a nozzle fixed in the inner chamber of the regulating organ.

7. A regulation valve according to claim 6, wherein the nozzle comprises a first section and a second section narrower than the first section, the first section having a contour substantially equal to a contour of the inner chamber and fixed to the inner chamber, the second section extending toward the outlet conduit at least from the second axial position.

8. A regulation valve according to claim 7, wherein the second section of the nozzle projects out of the regulating organ and extends towards the outlet conduit.

9. A regulation valve according to claim 1, wherein each of the first and second plurality of inlet holes of the regulating organ comprise a first hole corresponding to a maximum flow, a second hole corresponding to a descending intermediate flow, and a third hole corresponding to a minimum flow.

10. A regulation valve according to claim 9, wherein in a first angular position of the regulating organ the first hole of each of the first and second plurality of inlet holes is in alignment with the first and second gas inlets, respectively, in a second angular position of the regulating organ the third hole of each of the first and second plurality of inlet holes is in alignment with the first and second gas inlets, respectively, in angular positions of the regulating organ between the first and second angular positions the second hole of each of the first and second plurality of inlet holes is in alignment with the first and second gas inlets, respectively.

11. A regulation valve according to claim 10, wherein the valve body comprises an inner housing situated between the inlet conduit and the first and second gas inlets of the cavity that houses the regulating organ, the inner housing comprising at least one inlet hole that connects the inlet conduit to the inner housing, and first and second outlet holes that are respectively aligned with the first and second gas inlets of the cavity.

12. A regulation valve according to claim 11, further comprising a flow path selector disposed within the inner housing, the flow path selector moveable within the inner housing between a first flow path selector position and a second flow path selector position, in the first flow path selector position a first flow path is established by the flow path selector that connects the inlet conduit to the first gas inlet of the cavity that houses the regulating organ, in the second flow path selector position a second flow path is established by the flow path selector that connects the inlet conduit to the second gas inlet of the cavity that houses the regulating organ.

13. A regulation valve according to claim 12, wherein the flow path selector comprises a body axially movable in the inner housing, a central portion of the body comprising a plurality of axially spaced-apart circular closure segments, transversal to the body and with a larger diameter than the central portion and which are fitted on their outer diameter to the inner walls of the inner housing, the central portion of the body being capable of being disposed in a first axial position to establish the first flow path and a second axial position to establish the second flow path.

14. A regulation valve according to claim 12, wherein the inner housing comprises a central chamber which connects to the inlet conduit via the inlet hole of the inner housing, the central chamber having at a first end a first outlet connected to the first outlet of the inner housing, the central chamber having at a second end opposite the first end that has a second outlet connected to the second outlet of the inner housing, the flow path selector comprising a body axially movable in the inner housing between a first axial position and a second axial position, a central portion of the body situated within the central chamber and comprising first and second axially spaced-apart circular closure segments transversal to the body, each of the first and second circular closure segments having a larger diameter than the central portion of the body and having a larger diameter than the respective first and second outlets of the central chamber, the first and second circular closure segments being moveable towards and away from the respective first and second central chamber outlets as the body of the flow path selector is moved between the first and second axial positions, in the first axial position the first flow path being established with the first circular closure segment being spaced apart from the first outlet of the central chamber and the second circular closure segment being positioned adjacent the second outlet of the central chamber, in the second axial position the second flow path being established with the second circular closure segment being spaced apart from the second outlet of the central chamber and the first circular closure segment being positioned adjacent the first outlet of the central chamber.

15. A regulation valve according to claim 12, wherein the inner housing comprises a first inlet hole aligned with the first outlet hole corresponding to the liquefied gas, and a second inlet hole aligned with the second outlet hole corresponding to the natural gas, the flow path selector having a body comprising a central body fitted to the walls of the inner housing and axially movable in the inner housing, the central body including a hole that passes through it in a radial direction, in the first flow path selector position the central body being disposed in a first axial position in which the hole of the central body connects the first inlet hole to the first outlet hole of the inner housing, in the second flow path selector position the central body being disposed in a second axial position in which the hole of the central body connects the second inlet hole to the second outlet hole of the inner housing.

16. A regulation valve according to claim 12, wherein the inner housing comprises a central chamber connected to the inlet hole of the inner housing and disposed between first and second lateral chambers, the central chamber having at a first end a first outlet connected to the first lateral chamber and at a second end opposite the first end a second outlet connected to the second lateral chamber, the first lateral chamber connected to the first outlet hole of the inner housing, the second lateral chamber connected to the second outlet hole of the inner housing, the flow path selector comprising a body axially movable in the inner housing between a first axial position and a second axial position, a central portion of the body situated within the central chamber and comprising a circular closure segment transversal to the central body and with a larger diameter than the first and second outlets of the central chamber, the circular closure segment being moveable towards and away from the respective first and second central chamber outlets as the body of the flow path selector is moved between the first and second axial positions, in the first axial position the first flow path being established, in the second axial position the second flow path being established.

17. A regulation valve according to claim 12, wherein the inner housing comprises a first inlet hole aligned with the first outlet hole corresponding to the liquefied gas, and a second inlet hole aligned with the second outlet hole corresponding to the natural gas, the flow path selector having a body comprising a central body fitted to the walls of the inner housing, the central body comprising first and second axially spaced-apart holes that each pass through the central body, the first hole passing through the central body in a first radial direction, the second hole passing through the central body in a second radial direction different than the first radial direction, the central body rotatable between a first angular position and a second angular position, in the first angular position the first hole passing through the central body connects the first inlet hole of the inner housing to the first outlet hole of the inner housing, in the second angular position the second hole passing through the central body connects the second inlet hole of the inner housing to the second outlet hole of the inner housing.

18. A regulation valve according to claim 17, wherein the first and second angular positions are separated by 90 degrees.

19. A regulation valve according to claim 12, wherein the inner housing comprises a single inlet hole, the flow path selector having a body comprising a central body fitted to the walls of the inner housing, there existing a gas chamber in a space between an end of the central body and the single inlet hole, the central body comprising an axial hole connected to the gas chamber, the central body comprising first and second axially spaced-apart holes that each perforate the central body, the first hole passing through the central body in a first radial direction and connected to the axial hole, the second hole passing through the central body in a second radial direction different than the first radial direction and connected to the axial hole, the central body rotatable between a first angular position and a second angular position, in the first angular position the first hole passing through the central body connects the single inlet hole of the inner housing to the first outlet hole of the inner housing, in the second angular position the second hole passing through the central body connects the single inlet hole of the inner housing to the second outlet hole of the inner housing.

20. A regulation valve according to claim 19, wherein the first and second angular positions are separated by 90 degrees.

\* \* \* \* \*